April 29, 1958 — E. J. PREMO — 2,832,397
INTERCONNECTED SEAT CUSHION AND BACK
Filed May 17, 1954 — 2 Sheets-Sheet 1
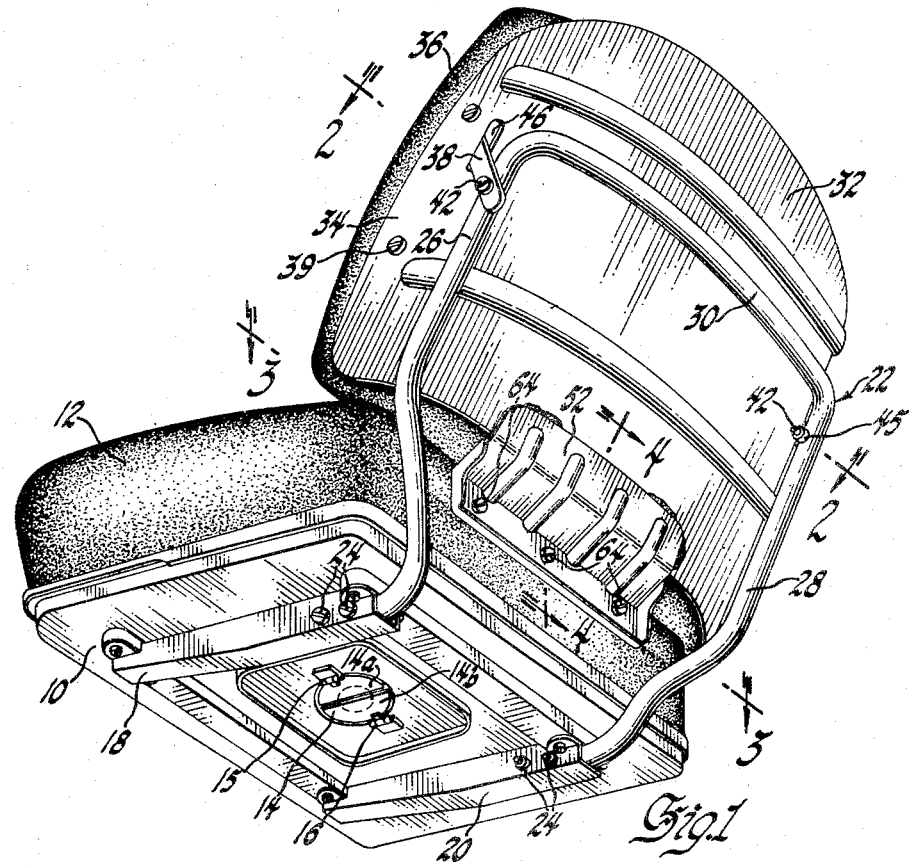
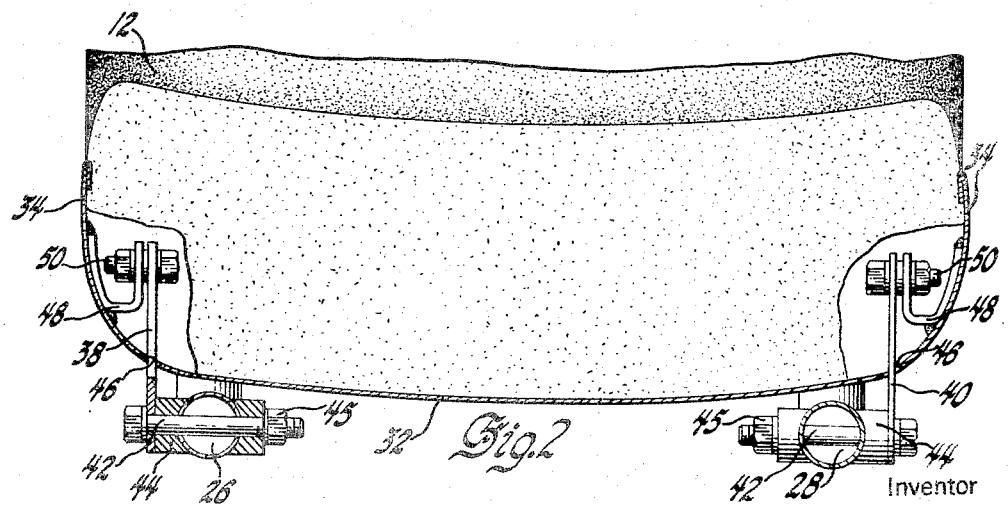
Inventor
Ellis J. Premo
Paul Fitzpatrick
Attorney April 29, 1958  E. J. PREMO  2,832,397
INTERCONNECTED SEAT CUSHION AND BACK
Filed May 17, 1954  2 Sheets-Sheet 2
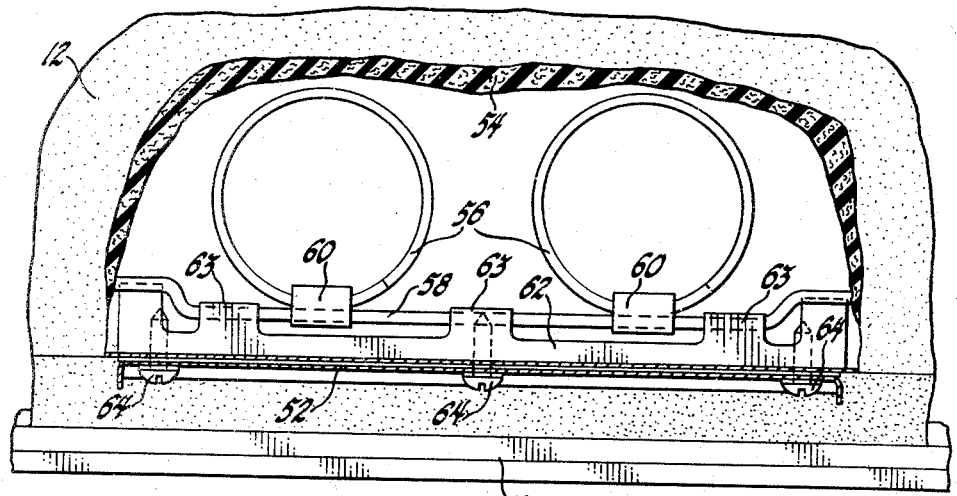
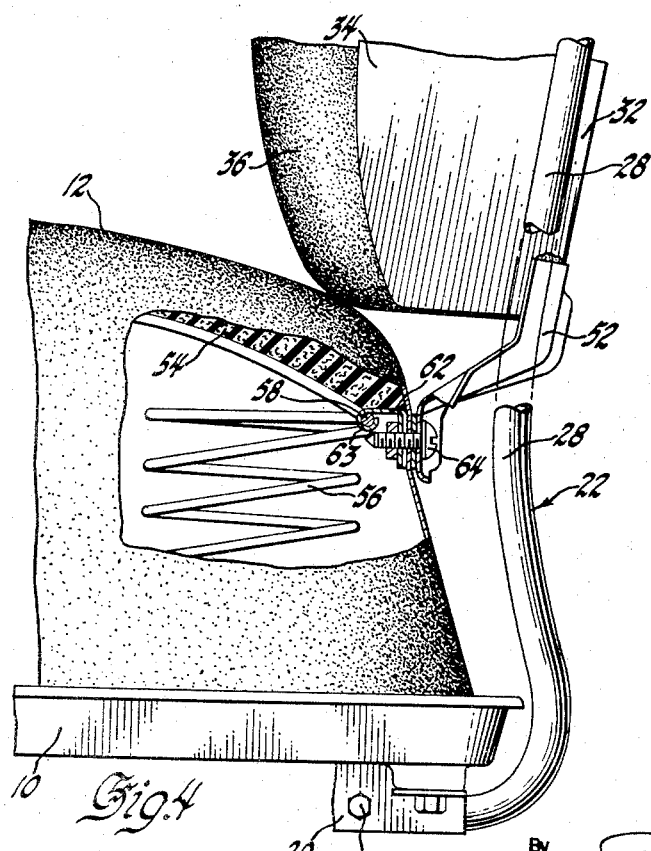
Inventor
Ellis J. Premo
By Paul Fitzpatrick
Attorney

United States Patent Office 2,832,397
Patented Apr. 29, 1958

2,832,397

INTERCONNECTED SEAT CUSHION AND BACK

Ellis J. Premo, Franklin, Mich., assignor to General Motors Corporation, Detroit, Mich., a corporation of Delaware Application May 17, 1954, Serial No. 430,129

2 Claims. (Cl. 155—9)

This invention relates to a vehicle seat construction, and more particularly to a vehicle seat having an interconnected seat cushion and back cushion.

One feature of the invention is that it provides an improved vehicle seat; another feature of the invention is that it provides improved means for interconnecting the seat cushion and back cushion; a further feature of the invention is that it provides improved means for connecting the panel which supports the back cushion to the back frame for movement relative thereto; and still another feature of the invention is that it provides improved means interconnecting the back supporting panel and the seat cushion to provide a so-called unison seat wherein the back cushion moves vertically with the seat cushion when the vehicle travels over bumps.

Other features and advantages of the invention will be apparent from the following description and from the drawings in which:

Fig. 1 is a rear perspective view of the novel seat removed from the vehicle;

Fig. 2 is an enlarged transverse horizontal section through the back cushion and its supporting panel and frame, taken along the line 2—2 of Fig. 1;

Fig. 3 is a fragmentary section through the upper portion of the seat cushion, being taken along the line 3—3 of Fig. 1; and Fig. 4 is a vertical section taken along the line 4—4 of Fig. 1.

In trucks and other commercial vehicles it is desirable to provide a seat construction wherein the seat back is interconnected with the springs in the seat cushion so that when bumps are encountered the back of the driver or passenger will not rub against the back cushion, but the back cushion will travel up and down with the seat cushion. A so-called unison seat of this type is particularly advantageous in commercial vehicles which must have a relatively hard suspension because of the type of service to which the vehicles are put. While the broad idea of interconnected seat and back cushions is old, the present invention provides an improved seat of this type including improved means for interconnecting the seat cushion and the back cushion and improved means for connecting the back cushion supporting panel to the back frame for movement relative thereto.

Referring now more particularly to the drawings, 10 is a base frame which is mounted on the vehicle floor and which supports a seat cushion 12. On the under side of the base frame is a spring biased flap valve 14 for dampening cushion rebound. When a bump is encountered and the weight of the passenger presses down heavily on the seat cushion, air which is normally within the cushion is expelled through the valve 14. The valve doors 14a and 14b are biased in hinges 15 and 16 to closed position so that, as the cushion attempts to rebound, air is blocked from entering the hollow space within the cushion.

Adjacent each side of the bottom surface of the base frame 10 are mounted channel supports 18 and 20 and a U-shaped tubular back frame designated generally as 22 has longitudinally extending portions at each side which enter these channels and are secured therein by means of screws 24 so that the back frame projects rigidly upwardly from the base frame. The back frame includes opposite side portions 26 and 28 spanned by a transverse integral upper portion 30.

Located forwardly of the back frame 22 there is a curved back cushion supporting panel 32 having at each side forwardly projecting arm portions 34 which are secured to and support a back cushion 36 by means of screws 39.

The cushion supporting panel 32 is supported from the back frame 26 for vertical movement relative thereto by means of links 38 and 40. Each link is articulated at one end to one of the side members 26, 28 of the back frame, being pivoted on a stud 42 which extends through openings in the tubular side member. A spacing block 44 holds the link away from the tubular side member to prevent physical interference as the link pivots, and each stud 42 has a threaded end with a nut 45 thereon.

As shown best in Figs. 1 and 2, the back cushion supporting panel 32 is formed with a pair of vertical slots 46, one slot being opposite each of the side members 26, 28 of the back frame. Each link 38 and 40 projects through one of the slots 46 in the panel 32 and is pivoted to the inner side of the panel by means of bent brackets 48 which are welded to the forwardly extending portions 34 of the panel and which carry studs 50 for pivotally supporting the end of the links. By virtue of this construction the panel 32 with its cushion 36 is supported from the back frame 22, but is vertically movable relative thereto. A bracket 52 is welded to the panel 32 and depends downwardly and forwardly therefrom for connecting the panel 32 and back cushion 36 to the seat cushion 12.

The inner construction of the seat cushion 12 is shown in Figs. 3 and 4. Below the outer fabric cover of the cushion there is a layer of foam rubber or other resilient material 54, and below this resilient layer are a plurality of coil springs 56 arranged in a pattern as is conventional in automobile seat cushions. The adjacent springs in the outer row of the pattern are interconnected by means of a peripheral wire member 58 which is secured by clips 60 to the top portion of each adjacent coil spring. A bracket 62, which is L-shaped in transverse section, is pivotally connected to the wire member 58 by means of a plurality of flanges 63 which extend from the horizontal arm of bracket 62 and are bent about the peripheral wire 58 as shown in Fig. 4. The vertical leg of the bracket 62 is connected by screws 64 to the lower edge of the bracket 52 so that the back cushion 36 and its supporting panel 32 are connected to the top portion of the coil springs in the seat cushion. In the event the driver or passenger bounces on the seat cushion 12, the vertical movement imparted to the top portion of the coil springs 56 will cause the back cushion 36 to move up and down with the top portion of the coil springs so that the driver or passenger's back will not slide on the back cushion 36. At the same time the flap valve 14 in the bottom of the seat will dampen springing oscillations of the seat cushion and bring both the seat cushion 12 and the back cushion 36 to rest in their normal position.

While I have shown and described one embodiment of my invention it is capable of many modifications. Changes, therefore, in the construction and arrangement may be made without departing from the spirit and scope of the invention as set forth in the appended claims.

I claim:

1. A vehicle seat construction of the character described, including: a fixed seat base comprising a base plate having spaced parallel longitudinally extending mounting channels located entirely within the periphery of the plate on the underside thereof; a seat cushion mounted on the upper side of said plate; a rigid peripheral back frame formed as an inverted U having opposite upwardly extending arms joined at the top by an integral web, each arm having an integral mounting end extension bent from the lower end thereof; means clamping each end extension in one of said mounting channels on the underside of said base frame so that said back frame is fixedly mounted on said base frame with the upwardly extending arms at the rear side thereof; a back cushion supporting panel located forwardly of said back frame above said seat cushion, said panel having a slot opposite the upper portion of each of said upwardly extending arms; a pair of links, each being articulated at one end to one of said arms and extending through the adjacent one of said slots; a support bracket mounted on said panel adjacent each slot on the opposite surface of said panel from said back frame; means pivotally connecting the other end of each link to one of said brackets to support the panel from the back frame for movement relative thereto; means interconnecting the lower edge of said panel and said cushion; and a back cushion mounted on said panel.

2. A vehicle seat construction of the character described, including: a fixed seat base comprising a base plate having spaced parallel longitudinally extending mounting channels located entirely within the periphery of the plate on the underside thereof; a seat cushion mounted on the upper side of said plate, said cushion including a plurality of coil springs; a rigid peripheral back frame constructed from a single tube of metal formed as an inverted U having opposite upwardly extending arms joined at the top by an integral web, each arm having an integral mounting end extension bent from the lower end thereof; means clamping each end extension in one of said mounting channels on the underside of said base frame so that said back frame is fixedly mounted on said base frame with the upwardly extending arms at the rear side thereof; a back cushion supporting panel located forwardly of said back frame above said seat cushion, said panel having a slot opposite the upper portion of each of said upwardly extending arms; a pair of links, each being articulated at one end to one of said arms and extending through the adjacent one of said slots; a support bracket mounted on said panel adjacent each slot on the opposite surface of said panel from said back frame; means pivotally connecting the other end of each link to one of said brackets to support the panel from the back frame for movement relative thereto; means connecting the lower edge of said panel to said coil springs in said cushion; and a back cushion mounted on said panel.

References Cited in the file of this patent

UNITED STATES PATENTS

| | | |
|---|---|---|
| 2,324,152 | Haberstump | July 13, 1943 |
| 2,346,414 | Carpenter | Apr. 11, 1944 |
| 2,466,345 | Wyeth | Apr. 5, 1949 |
| 2,715,938 | Miller | Aug. 23, 1955 |